United States Patent
Kim et al.

(10) Patent No.: US 9,182,274 B2
(45) Date of Patent: Nov. 10, 2015

(54) OPTICAL MEASURING APPARATUS AND METHOD OF STEREOSCOPIC DISPLAY DEVICE

(71) Applicant: LG Display Co., Ltd., Seoul (KR)

(72) Inventors: Jae Hong Kim, Seoul (KR); Dong Gyou Lee, Seoul (KR); Kyong Ho Lim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 14/510,640

(22) Filed: Oct. 9, 2014

(65) Prior Publication Data

US 2015/0022804 A1   Jan. 22, 2015

Related U.S. Application Data

(62) Division of application No. 12/978,953, filed on Dec. 27, 2010, now Pat. No. 8,861,835.

(30) Foreign Application Priority Data

Oct. 29, 2010 (KR) .................. 10-2010-0107078

(51) Int. Cl.
*G01B 11/14* (2006.01)
*G01J 1/42* (2006.01)
*G02B 27/22* (2006.01)
(Continued)

(52) U.S. Cl.
CPC ............. *G01J 1/42* (2013.01); *G02B 27/2228* (2013.01); *G09G 3/00* (2013.01); *H04N 13/0425* (2013.01); *H04N 13/0438* (2013.01)

(58) Field of Classification Search
CPC ........... G02B 27/2228; H04N 13/0438; H04N 13/0425; H04N 2013/0092; G09G 3/00
See application file for complete search history.

(56) References Cited

U.S. PATENT DOCUMENTS

| 5,459,594 | A | 10/1995 | Nakanishi et al. |
| 6,657,712 | B2 | 12/2003 | Yamaguchi |
| 2002/0039230 | A1 | 4/2002 | Lin |

(Continued)

FOREIGN PATENT DOCUMENTS

| CN | 201218753 A | 8/2004 |
| CN | 1788498 A | 6/2006 |

(Continued)

OTHER PUBLICATIONS

Beldie, Ion P., and Bernd Kost. "Luminance asymmetry in stereo TV images." Electronic Imaging'91, San Jose, CA. International Society for Optics and Photonics, 1991.*

(Continued)

*Primary Examiner* — Kara E Geisel
*Assistant Examiner* — Rufus Phillips
(74) *Attorney, Agent, or Firm* — Morgan, Lewis & Bockius LLP

(57) ABSTRACT

An optical measuring apparatus for measuring optical characteristics of a stereoscopic display device includes a test image supplier for generating a 3D test signal, a 3D display for displaying left-eye image and/or right-eye image based on the 3D test signal supplied from the test image supplier, a image selection member for selectively transmitting the left-eye image and right-eye image to be displayed on the 3D display, and a light measuring device for measuring intensity or color information of the image transmitted via the image selection member.

15 Claims, 5 Drawing Sheets

(51) Int. Cl.
*G09G 3/00* (2006.01)
*H04N 13/04* (2006.01)

(56) References Cited

U.S. PATENT DOCUMENTS

| | | | |
|---|---|---|---|
| 2004/0212680 A1 | 10/2004 | Schroeder et al. | |
| 2006/0160436 A1 | 7/2006 | Oka et al. | |
| 2006/0268104 A1* | 11/2006 | Cowan et al. | 348/42 |
| 2008/0136900 A1 | 6/2008 | Grasnick | |
| 2009/0190210 A1* | 7/2009 | Coleman et al. | 359/452 |
| 2010/0151761 A1 | 6/2010 | Miyazaki et al. | |

FOREIGN PATENT DOCUMENTS

| | | |
|---|---|---|
| CN | 1929561 A | 3/2007 |
| DE | 4331715 A | 3/1995 |
| DE | 20100764 A | 5/2001 |
| DE | 20111617 A | 1/2002 |
| EP | 2424258 A2 | 2/2012 |
| EP | 2445225 A1 | 4/2012 |
| EP | 2544459 A1 | 1/2013 |
| GB | 2404106 A | 1/2005 |
| JP | 2010245844 A | 10/2010 |
| KR | 1020060054973 A | 5/2006 |
| KR | 20090020892 A | 2/2009 |
| KR | 20100091134 A | 8/2010 |
| WO | 02/097507 A | 12/2002 |
| WO | 2005/052538 A | 6/2005 |
| WO | 2007/018969 A | 2/2007 |

OTHER PUBLICATIONS

Chinese Office Action dated Nov. 21, 2013.
Korean Office Action (Application No. 10-2010-0107078), dated Jan. 3, 2013.
"Measurement of Contrast Ratios for 3D Display," Kuo-Chung Huang, et al., Defense Technical Information Center Compilation Part Notice ADP011343, Proc SPIE, vol. 4080, pp. 78-96 (2000), ISSN 0277-786X.
United Kingdom Examination Report issued Mar. 1, 2013.
Boydstun et al. (Stereoscopic depth perception survives significant interocular luminance differences); Journal of the Society for Information Display 17/5, 2009.
Boev (Crosstalk measurement methodology for auto-stereoscopic screens); 3DTV Conference 2007.
Woods (Understanding crosstalk in stereoscopic displays); 2010; 3DSA Conference.

\* cited by examiner

OPTICAL MEASURING APPARATUS AND METHOD OF STEREOSCOPIC DISPLAY DEVICE

CROSS REFERENCE TO RELATED APPLICATIONS

This application is a Divisional application of co-pending U.S. patent application Ser. No. 12/978,953, filed on Dec. 27, 2010, which claims the benefit of the Korean Patent Application No. 10-2010-0107078 filed on Oct. 29, 2010, which is hereby incorporated by reference as if fully set forth herein.

BACKGROUND OF THE INVENTION

1. Field of the Invention

The present invention relates to a stereoscopic display device, and more particularly, to an optical measuring apparatus and method of measuring optical characteristics of the stereoscopic display device.

2. Background of the Related Art

With the practical use of 3D video broadcasting, the stereoscopic display device has recently attracted great attention as the next generation display device. Accordingly, there has been an increasing need to measure optical characteristics of the stereoscopic display device, and to inform consumers of the product superiority.

Since the stereoscopic display device is still in its early stage, there is no objective standardized system for measuring the optical characteristics of the stereoscopic display device, and therefore it is difficult to provide the consumers with information about the optical characteristics of the stereoscopic display device. For this reason, even though there is great attention to the stereoscopic display device as the next generation display device, the 3D video broadcasting and stereoscopic display device has not been popularized as expected. Accordingly, it is highly desirable to develop an apparatus (system) and a method of measuring the objective optical characteristics of the stereoscopic display device, for example, luminance, average luminance, interocular luminance difference, luminous non-uniformity, dark-room contrast ratio, white chromaticity, colour gamut, interocular chromatic difference, and chromatic non-uniformity, or gamma value.

SUMMARY OF THE INVENTION

Accordingly, the present invention is directed to an optical measuring apparatus and method of measuring the objective optical characteristics of a stereoscopic display device that substantially obviates one or more problems due to limitations and disadvantages of the related art.

An object of the present invention is to provide an optical measuring apparatus and method of measuring the objective optical characteristics of a stereoscopic display device, which facilitates to measure the optical characteristics of stereoscopic display device.

Additional advantages and features of the invention will be set forth in part in the description which follows and in part will become apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described herein, the optical measuring apparatus of stereoscopic display device comprises a test image supplier for generating a 3D test signal; a 3D display for displaying left-eye image and/or right-eye image based on the 3D test signal supplied from the test image supplier; an image selection member for selectively transmitting the left-eye image and right-eye image to be displayed on the 3D display; and a light measuring device for measuring intensity or color information of the image transmitted via the image selection member.

In addition, the light measuring device generates optical characteristic information of the 3D display according to the measured intensity or color information of the image.

In another aspect of the present invention, the optical measuring method of stereoscopic display device comprises generating a 3D test signal; displaying left-eye image and/or right-eye image based on the 3D test signal on a 3D display; transmitting the left-eye image or right-eye image to be displayed on the 3D display through the use of image selection member; and measuring intensity or color information of the left-eye image or right-eye image transmitted via the image selection member through the use of light measuring device.

In addition, the optical measuring method further comprises generating optical characteristic information of the 3D display according to the measured intensity or color information of the image through the use of the light measuring device. At this time, the optical characteristic information includes at least one of luminance, average luminance, interocular luminance difference, luminous non-uniformity, dark-room contrast ratio, white chromaticity, colour gamut, interocular chromatic difference, chromatic non-uniformity, and gamma values for the left-eye image and right-eye image.

The light measuring device is movably provided while being parallel to each of plural measuring points on a screen of the 3D display. The plural measuring points include a center measuring point which is set to be positioned in the center of the screen of the 3D display; first to fourth measuring points which are set to be positioned at the respective corners of the screen of the 3D display; and fifth to eighth measuring points that are set to be positioned between two neighboring measuring points of first to fourth measuring points.

The 3D display displays the left-eye image and/or right-eye image that are temporally or spatially divided.

The image selection member comprises a left lens for selecting only the left-eye image displayed on the 3D display; and a right lens for selecting only the right-eye image displayed on the 3D display.

Any one of the left-eye image and right-eye image is displayed as a full screen white image, and the other is displayed as a full screen white image or full screen black image.

The light measuring device measures the luminance of the left-eye image corresponding to the full screen white image incident via the left lens at the center measuring point, and measures the luminance of the right-eye image corresponding to the full screen white image incident via the right lens at the center measuring point.

The light measuring device calculates a white luminance for each of the specified measuring points of the left-eye image corresponding to the full screen white image incident via the left lens at the respective positions corresponding to the center measuring point and first to fourth measuring points or the center measuring point and first to eighth measuring points; and the light measuring device calculates a white luminance for each of the specified measuring points of the right-eye image corresponding to the full screen white image incident via the right lens at the respective positions corresponding to the center measuring point and first to fourth measuring points or the center measuring point and first to eighth measuring points.

The process of generating the optical characteristic information of the 3D display comprises calculating the average luminance of the left-eye image by averaging the white luminance for each of the specific measuring points of the left-eye image; and calculating the average luminance of the right-eye image by averaging the white luminance for each of the specific measuring points of the right-eye image.

The process of generating the optical characteristic information of the 3D display further comprises calculating the interocular luminance difference corresponding to the difference between the average luminance of the left-eye image and the average luminance of the right-eye image.

The process of generating the optical characteristic information of the 3D display comprises calculating the luminous non-uniformity for each of the specified measuring points of the left-eye image by subtracting the average luminance of the left-eye image from the white luminance for each of the specified measuring points of the left-eye image; and calculating the luminous non-uniformity for each of the specified measuring points of the right-eye image by subtracting the average luminance of the right-eye image from the white luminance for each of the specified measuring points of the right-eye image.

At this time, both the left-eye image and right-eye image are the full screen white images or both the left-eye image and right-eye image are the full screen black images.

The light measuring device measures a white luminance of the left-eye image corresponding to the full screen white image incident via the left lens at the center measuring point, and a white luminance of the right-eye image corresponding to the full screen white image incident via the right lens at the center measuring point; and the light measuring device measures a black luminance of the left-eye image corresponding to the full screen black image incident via the left lens at the center measuring point, and a black luminance of the right-eye image corresponding to the full screen black image incident via the right lens at the center measuring point.

The process of generating the optical characteristic information of the 3D display comprises calculating a dark-room contrast ratio of the left-eye image by dividing the black luminance of the left-eye image into the white luminance of the left-eye image; calculating a dark-room contrast ratio of the right-eye image by dividing the black luminance of the right-eye image into the white luminance of the right-eye image; and calculating a dark-room contrast ratio of the 3D display by averaging the dark-room contrast ratio of the left-eye image and the dark-room contrast ratio of the right-eye image.

The respective left-eye image and right-eye image are the same full screen red images, full screen green images, and full screen blue images.

The light measuring device measures color information of the left-eye image incident via the left lens at the center measuring point, and measures color information of the right-eye image incident via the right lens at the center measuring point, wherein the color information of the left-eye image and right-eye image is the chromaticity coordinates of the full screen red images, full screen green images, and full screen blue images.

The process of generating the optical characteristic information of the 3D display comprises calculating the colour gamut of the left-eye image based on the color information of the left-eye image; and calculating the colour gamut of the right-eye image based on the color information of the right-eye image.

The left-eye image and right-eye image are the full screen white images, and wherein the light measuring device measures the chromaticity coordinates of the left-eye image corresponding to the full screen white image incident via the left lens at the center measuring point, and measures the chromaticity coordinates of the right-eye image corresponding to the full screen white image incident via the right lens at the center measuring point.

The process of generating the optical characteristic information of the 3D display comprises calculating the white chromaticity of the left-eye image corresponding to the chromaticity coordinates of the left-eye image; and calculating the white chromaticity of the right-eye image corresponding to the chromaticity coordinates of the right-eye image.

The process of generating the optical characteristic information of the 3D display further comprises calculating the interocular chromatic difference by subtracting the white chromaticity of the right-eye image from the white chromaticity of the left-eye image.

The left-eye image and right-eye image are the full screen white images, wherein the light measuring device measures the chromaticity coordinates for each of the specified measuring points of the left-eye image incident via the left lens at the respective positions corresponding to the center measuring point and first to eighth measuring points; and the light measuring device measures the chromaticity coordinates for each of the specified measuring points of the right-eye image incident via the right lens at the respective positions corresponding to the center measuring point and first to eighth measuring points.

The process of generating the optical characteristic information of the 3D display comprises calculating the white chromaticity for each of the specified measuring points of the left-eye image based on the chromaticity coordinates for each of the specified measuring points of the left-eye image; and calculating the white chromaticity for each of the specified measuring points of the right-eye image based on the chromaticity coordinates for each of the specified measuring points of the right-eye image.

The process of generating the optical characteristic information of the 3D display comprises calculating the chromatic non-uniformity for each of the first to eighth measuring points of the left-eye image by subtracting the white chromaticity of the center measuring point from the white chromaticity for each of the first to eighth measuring points of the left-eye image; and calculating the chromatic non-uniformity for each of the first to eighth measuring points of the right-eye image by subtracting the white chromaticity of the center measuring point from the white chromaticity for each of the first to eighth measuring points of the right-eye image.

Any one of the left-eye image and right-eye image is displayed as a full screen gray image whose gray scale is changed from a full screen black gray scale to a full screen white gray scale every predetermined number of frames; and the other is the full screen white image, full screen black image, or full screen gray scale image.

The light measuring device measures the luminance for each gray scale of the left-eye image incident via the left lens at the center measuring point, and measures the luminance for each gray scale of the right-eye image incident via the right lens at the center measuring point.

The process of generating the optical characteristic information of the 3D display comprises calculating the gamma value of the left-eye image based on the luminance for each of the gray scales of the left-eye image; and calculating the gamma value of the right-eye image based on the luminance for each of the gray scales of the right-eye image.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the exemplary embodiments of the present invention, examples of which are illustrated in the accompanying drawings. Wherever possible, the same reference numbers will be used throughout the drawings to refer to the same or like parts.

Hereinafter, an optical measuring apparatus for a stereoscopic display according to an exemplary embodiment of the present invention will be described with reference to the accompanying drawings.

There is proposed an optical measuring apparatus and method of measuring optical characteristics of a stereoscopic display device. The optical characteristics of the stereoscopic display device include, but are not limited to, luminance, average luminance, interocular luminance difference, luminous non-uniformity, dark-room contrast ratio, white chromaticity, colour gamut, interocular chromatic difference, and chromatic non-uniformity, or gamma value.

The optical measuring apparatus and method of measuring the optical characteristics of the stereoscopic display device according to the exemplary embodiment may be applied to the following 3D display methods:

1. Stereoscopic image displaying method including displays representing temporally interlaced (high frame rate) images and time dividing shutter glasses.
2. Stereoscopic image displaying method including displays with front screen switchable polarizer representing temporally interlaced images and linear or circular polarizer glasses.
3. Stereoscopic image displaying method including displays with patterned retarder representing spatially interlaced images and linear or circular polarizer glasses.

All or some parts of these measuring methods may also be applied to other types of stereoscopic displays using glasses not listed above.

Figure 1:
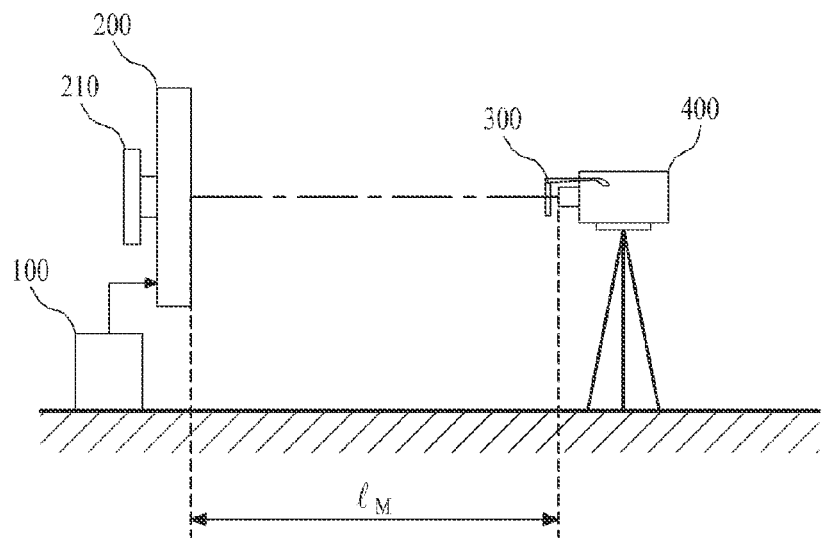
FIG. 1 schematically illustrates an optical measuring apparatus for a stereoscopic display device according to an exemplary embodiment of the present invention.
Figure 2:
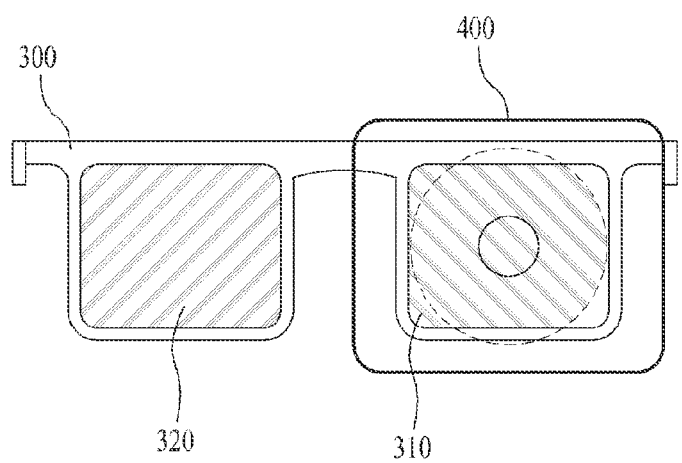
FIG. 2 schematically illustrates stereoscopic glasses held adjacent to a light measuring device shown in FIG. 1.

FIG. 1 illustrates an optical measuring apparatus for the stereoscopic display device according to the exemplary embodiment. Referring to FIG. 1, the optical measuring apparatus for the stereoscopic display device according to the exemplary embodiment may include a test image supplier 100, a 3D display 200, image selection member (or polarizer glasses) 300, and a light measuring device 400.

The test image supplier 100 generates a 3D test signal to measure the optical characteristics, and supplies the generated 3D test signal to the 3D display 200. In this case, measuring items, which are the optical characteristics of the 3D display to be measured, may be luminance, average luminance, luminous non-uniformity, interocular luminance difference, dark-room contrast ratio, colour gamut, white chromaticity, white chromatic uniformity, interocular chromatic difference, or gamma value.

The 3D test signal includes a left-eye image (L) and a right-eye image (R) that are temporally or spatially divided and displayed. In this case, the left-eye image (L) and right-eye image (R) may be generated corresponding to the measuring items, namely, the optical characteristics of the 3D display 200 to be measured by the light measuring device 400.

In this exemplary embodiment, if the luminance, average luminance, interocular luminance difference, and luminous non-uniformity of the 3D display 200 are measured, any one of the left-eye image (L) and right-eye image (R) is displayed as a full screen white image, and the other is displayed as a full screen white image or full screen black image. If the dark-room contrast ratio of the 3D display 200 is measured, both the left-eye image (L) and right-eye image (R) are displayed as the full screen white images or full screen black images. If the colour gamut is measured, the left-eye image (L) and right-eye image (R) are displayed as full screen red image, full screen green image, or full screen blue image. If the white chromaticity, white chromatic uniformity, and interocular chromatic difference of the 3D display 200 are measured, the left-eye image (L) and right-eye image (R) are displayed as the full screen white images. If the gamma value of the 3D display 200 is measured, any one of the left-eye image (L) and right-eye image (R) is displayed as a full screen gray image, and the other is displayed as a full screen white image or full screen black image. Herein, the full screen gray image is changed in its gray scale from the full screen black image to the full screen white image every predetermined number of frames.

TABLE 1

|  | 3D Image | | |
| --- | --- | --- | --- |
| Measuring Item | Left-eye Image(L) | Right-eye Image(R) | Measuring Point(P) |
| Luminance, | Full Screen White | Full Screen White | P0, P0~P4, P0~P8 |
| Average Luminance, | Full Screen White | Full Screen Black | |
| Interocular Luminance Difference, | Full Screen Black | Full Screen White | |
| Luminous Non-uniformity | | | |
| Dark-Room Contrast Ratio | Full Screen White | Full Screen White | P0 |
| | Full Screen Black | Full Screen Black | |
| Colour Gamut | Full Screen Red | Full Screen Red | P0 |
| | Full Screen Green | Full Screen Green | |
| | Full Screen Blue | Full Screen Blue | |
| White Chromaticity, | Full Screen White | Full Screen White | P0, P0~P4, P0~P8 |
| White Chromatic Uniformity, | | | |
| Interocular Chromatic Deference | | | |
| Gamma Value | Full Screen Gray | Full Screen White | P0 |
| | Full Screen Gray | Full Screen Black | |
| | Full Screen Gray | Full Screen Gray | |
| | Full Screen Black | Full Screen Gray | |
| | Full Screen White | Full Screen Gray | |

The 3D display 200 is held by a holder 210 such that the holder 210 is installed inside a dark room (not shown) maintained at 1 Lux or less. At this time, the 3D display 200 may be vertically held while being maintained at a predetermined height from the floor of the dark room, or may be held while being rotated at a predetermined direction. The 3D display 200 displays the left-eye image (L) and/or right-eye image (R) that are temporally or spatially divided based on the 3D test signal supplied from the test image supplier 100. For this, the 3D display 200 may include a 3D display panel (not shown) and a panel driver (not shown).

The 3D display panel using a shutter glass method may include a plurality of unit pixels (not shown). Each of the plural unit pixels includes red, green, and blue sub-pixels for displaying images, which may be formed at every region obtained by crossing a plurality of horizontal lines and vertical lines.

The 3D display panel using a patterned retarder method may include a plurality of unit pixels (not shown), a plurality of left-eye retarder patterns, and a plurality of right-eye retarder patterns. Each of the plural unit pixels includes red, green, and blue sub-pixels for displaying images, which may be formed at every region obtained by crossing a plurality of horizontal lines and vertical lines. At this time, the plurality of horizontal lines or vertical lines may be divided into left-eye image displaying lines and right-eye image displaying lines. For example, the odd-numbered horizontal line may be set as the left-eye image displaying line, and the even-numbered horizontal line may be set as the right-eye image displaying line. On the contrary, the odd-numbered horizontal line may be set as the right-eye image displaying line, and the even-numbered horizontal line may be set as the left-eye image displaying line. According to another example, the odd-numbered vertical line may be set as the left-eye image displaying line, and the even-numbered vertical line may be set as the right-eye image displaying line. On the contrary, the odd-numbered vertical line may be set as the right-eye image displaying line, and the even-numbered vertical line may be set as the left-eye image displaying line.

Each of the plural left-eye retarder patterns may be formed corresponding to the left-eye image displaying line, to thereby polarize the left-eye image (L) displayed in the left-eye image displaying line. Each of the plural right-eye retarder patterns may be formed corresponding to the right-eye image displaying line, to thereby polarize the right-eye image (R) displayed in the right-eye image displaying line. The left-eye retarder pattern and right-eye retarder pattern have the different optical axes from each other.

The panel driver displays the left-eye image (L) and/or right-eye image (R), which corresponds to the 3D test signal supplied from the test image supplier 100, on the 3D display panel according to an exemplary driving method of the 3D display panel.

In the 3D display panel using the shutter glass method, the panel driver alternately displays the left-eye image (L) and right-eye image (R) corresponding to the 3D test signal supplied from the test image supplier 100 every one frame. For this, the panel driver may include an image converter (not shown) for converting the 3D test signal to the left-eye image (L) and right-eye image (R), and a shutter control signal generator (not shown) for generating and transmitting a shutter control signal corresponding to the left-eye image (L) or right-eye image (R) displayed on the 3D display panel.

In the 3D display panel using the patterned retarder method, the panel driver displays the left-eye image (L) and right-eye image (R) corresponding to the 3D test signal supplied from the test image supplier 100 in the left-eye image displaying line and right-eye image displaying line. For this, the panel driver may include an image converter (not shown) for converting the 3D test signal to the left-eye image (L) and right-eye image (R).

Moreover, if the 3D display panel is a liquid crystal display panel, the 3D display may include a backlight unit (not shown) for emitting light to the 3D display panel.

The image selection member 300 is installed to face the 3D display 200. Here, the image selection member 300 can be glasses for either the shutter glasses method 3D display or the pattern retarder method 3D display. The image selection member 300 selectively transmits the left-eye image (L) and right-eye image (R) displayed on the 3D display 200 so that the selectively-transmitted image is supplied to the light measuring device 400. For this, the image selection member 300 may include a left-eye lens of the glasses (for convenience, hereinafter, referred to as 'left lens') 310, and a right-eye lens of the glasses (for convenience, hereinafter, referred to as 'right lens') 320.

The left lens 310 transmits only the left-eye image (L) displayed on the 3D display 200. According to the exemplary embodiment of the present invention, if the 3D display 200 displays the left-eye image (L) on the basis of the shutter glass method, the left lens 310 may include a liquid crystal layer that is driven by the shutter control signal outputted from the 3D display 200 so as to transmit only the left-eye image (L). If the 3D display 200 displays the left-eye image (L) on the basis of the patterned retarder method, the left lens 310 may include a polarizing filter that transmits only the left-eye image (L). When the optical characteristics of the left-eye image (L) displayed on the 3D display 200 are measured, the left lens 310 may be installed facing the light measuring device 400. In this case, the left lens 310 may be held in a glass holder (not shown) or the light measuring device 400. When the left lens 310 in the glass holder (not shown) or light measuring device 400 is held, the left lens 310 is positioned adjacent to the light measuring device 400 without being in contact with the light measuring device 400. The left lens 310 may be provided at a predetermined interval, for example, at least 10 mm from the light measuring device 400.

Figure 3:
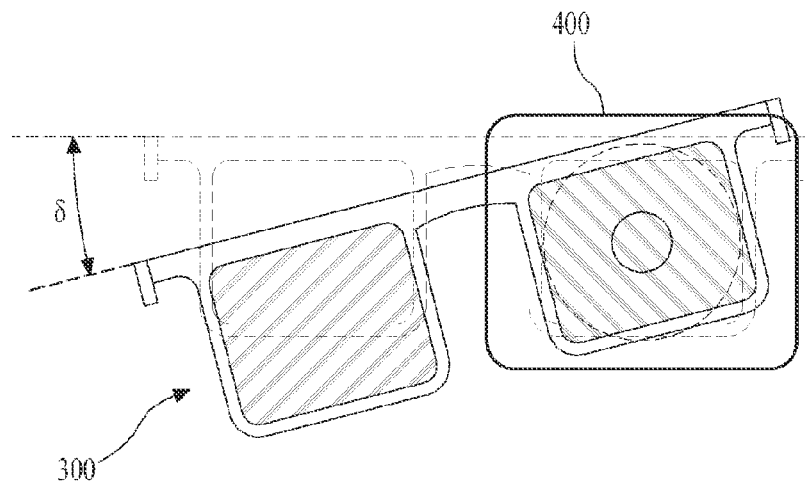
FIG. 3 schematically illustrates stereoscopic glasses held adjacent to a light measuring device while being positioned at a predetermined rotation angle shown in FIG. 1.

The right lens 320 transmits only the right-eye image (R) displayed on the 3D display 200. According to the exemplary embodiment of the present invention, if the 3D display 200 displays the right-eye image (R) on the basis of the shutter glass method, the right lens 320 may include a liquid crystal layer that is driven by the shutter control signal outputted from the 3D display 200 so as to transmit only the right-eye image (R). If the 3D display 200 displays the right-eye image (R) on the basis of the patterned retarder method, the right lens 320 may include a polarizing filter that transmits only the right-eye image (R). When the optical characteristics of the right-eye image (R) displayed on the 3D display 200 are measured, the right lens 320 may be installed facing the light measuring device 400. In this case, the right lens 320 may be held in an additional glass holder (not shown) provided adjacent to the light measuring device 400, or a glass holder (not shown) provided in the light measuring device 400. The left lens 310 may be provided at a predetermined interval from the light measuring device 400 without being in contact with the light measuring device 400, for example, at least 10 mm As shown in FIG. 3, the image selection member 300 may be held in the glass holder (not shown) while being positioned at a predetermined rotation angle (δ) with respect to the light measuring device 400. Thus, the optical characteristics of the 3D display 200 are measured by rotating the image selection member 300. The rotation angle (δ) may be defined by a clockwise rotation angle shown from the light measuring device 400, that is, an angle rotated with respect to a horizontal axis of the 3D display 200.

The aforementioned glass holder may have a slide mechanism to change the lens from left to right and from right to left, and/or a mechanism to rotate or tilt the left lens 310 and right lens 320.

In FIG. 1, the light measuring device 400 measures intensity or color information of the image transmitting via the image selection member 300. At this time, the light measuring device 400 may be provided at a predetermined measuring distance ($l_M$) from the 3D display 200, and the light measuring device 400 may be installed inside the dark room while being perpendicularly aligned with the 3D display 200. At this time, the measuring distance (N) is above 2 m (meter), or 3L (herein, 'L' may be a height (V), width (H), or diagonal length of screen of the 3D display).

Figure 4:
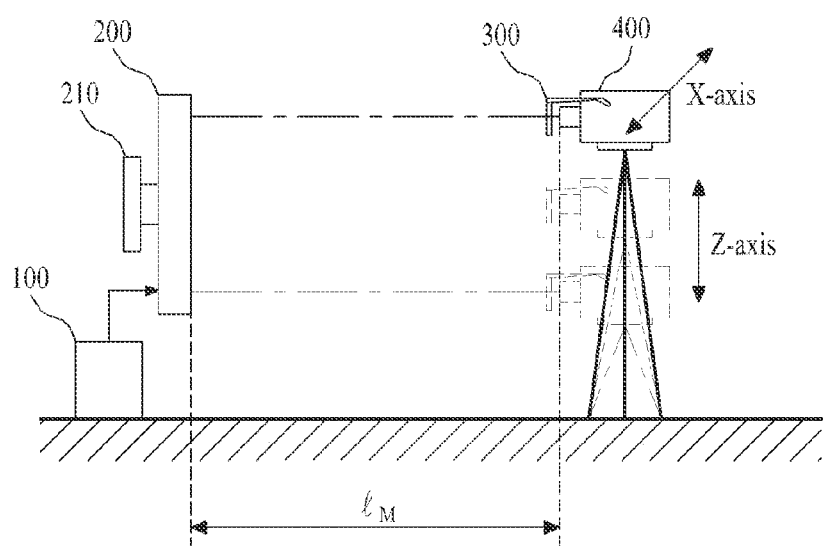
FIG. 4 schematically illustrates a light measuring device that is movably provided at a plurality of measuring points according to an exemplary embodiment of the present invention.
Figure 5:
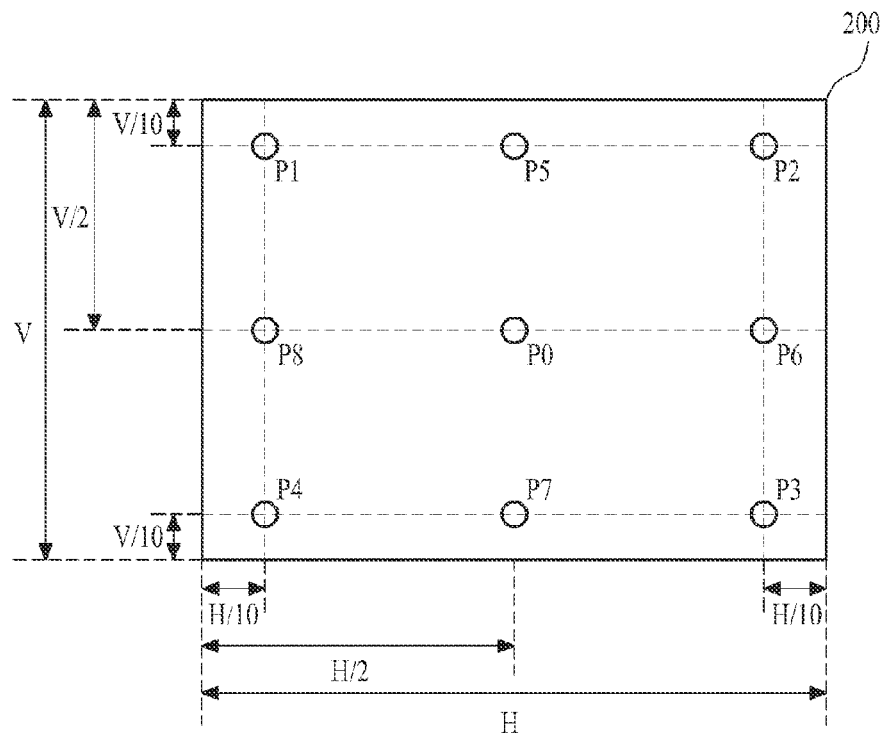
FIG. 5 schematically illustrates a plurality of measuring points set in a 3D display according to an exemplary embodiment of the present invention.

As shown in FIGS. 4 and 5, the light measuring device 400 may be installed movably in up-and-down directions (Z-axis) and left-and-right direction (X-axis) so that the light measuring device 400 is positioned parallel to each of plural measuring points (P0 to P8) on the screen of the 3D display 200. At this time, the light measuring device 400 is moved to be perpendicular to the measuring points (P0 to P8) on the screen of the 3D display 200.

The plural measuring points include, but are not limited to, measuring points 0 to 8 (P0 to P8). The measuring point 0 (P0) may be set to be positioned in the center of the screen of the 3D display 200. Each of the measuring points 1 to 4 (P1 to P4) may be set to be positioned at each corner of the screen of the 3D display 200. For example, each of the measuring points 1 to 4 (P1 to P4) may be positioned at a predetermined corner portion that is maintained at a predetermined interval corresponding to 1/10 each of the height (V) and width (H) of the screen from each edge of the screen of the 3D display 200. The measuring points 5 to 8 (P5 to P8) may be positioned between each of the neighboring measuring points 1 to 4 (P1 to P4). For example, the measuring points 5 to 8 are positioned on the central lines of the height (V) and width (H) of the screen, and each of the measuring points 5 to 8 is maintained at a predetermined interval corresponding to 1/10 each of the height (V) and width (H) of the screen from each edge of the screen of the 3D display 200.

Figure 6:
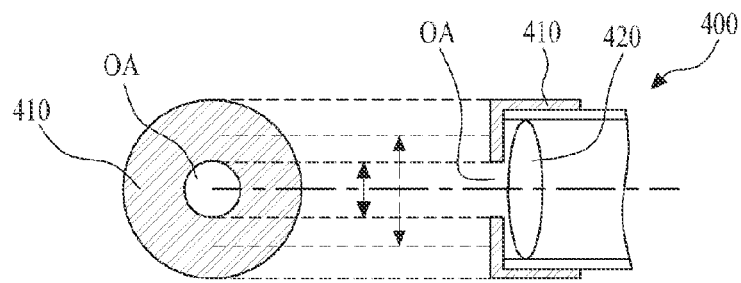
FIG. 6 schematically illustrates an aperture of a light measuring device according to an exemplary embodiment of the present invention.

As shown in FIG. 6, the light measuring device 400 may include an aperture (OA), on which the light transmitting the image selection member 300 is incident. The size of the aperture (OA) may be adjusted by an aperture ring 410, wherein the size of the aperture (OA) is smaller than the size of the left lens and right lens. Also, an object lens 420 of the light measuring device 400, on which the light is incident by the aperture (OA), is smaller than the size of the left lens and right lens; and the object lens 420 is positioned adjacent to the aperture (OA) at maximum. The light measuring device 400 may measure the intensity or color information of the left-eye image (L) or right-eye image (R) incident via the aperture (OA) and object lens 420.

Furthermore, the light measuring device 400 may analyze the measured image intensity or color information, and generate the optical characteristics of the 3D display 200. That is, the light measuring device 400 calculates at least one of luminance ($L_L$, $L_R$), average luminance ($L_{Lav}$, $L_{Rav}$), luminous non-uniformity ($\Delta L_{Li}$, $\Delta L_{Ri}$), interocular luminance difference ($\Delta L_{av}$, L–R), dark-room contrast ratio (DRCR), colour gamut, white chromaticity ($C_L(u', v')$, $C_R(u', v')$), interocular chromatic difference ($\Delta_{LR}u'$, $\Delta_{LR}v'$), white chromatic uniformity (($\Delta u'_{Li}$, $\Delta v'_{Li}$), ($\Delta u'_{Ri}$, $\Delta v'_{Ri}$)), and gamma value ($GV_L$, $GV_R$) according to the measured image intensity or color information; and then provides the calculated one to a user. The light measuring device 400 will be described in detail as follows.

Figure 7A:
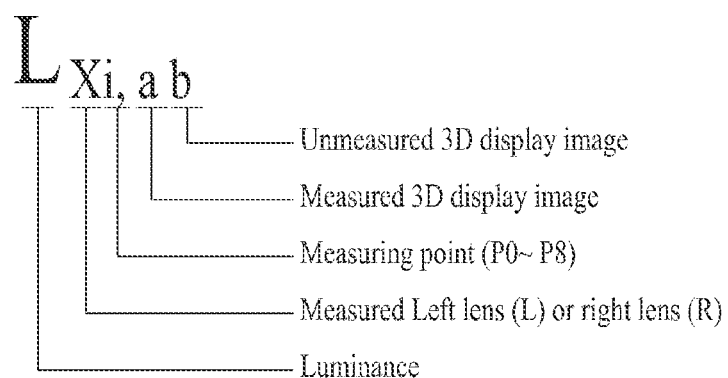
FIGS. 7A and 7B schematically illustrate symbols and their subscripts used for an exemplary embodiment of the present invention.
Figure 7B:
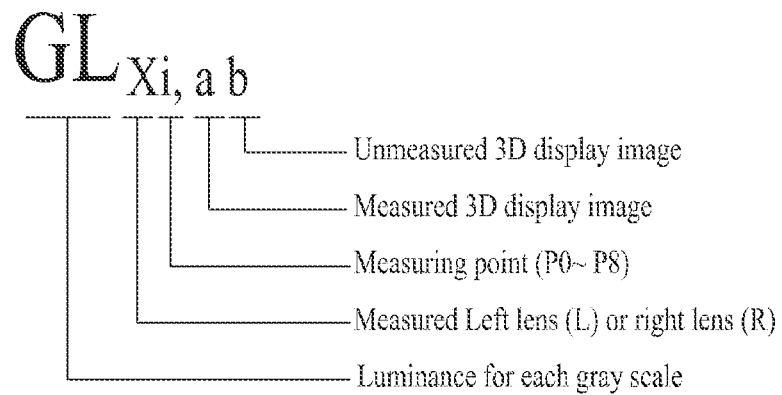

First, the symbols to be described and their subscripts will be defined as shown in FIGS. 7A and 7B. In measuring methods according to first and second exemplary embodiments of the present invention, if the luminance of the 3D display 200 is measured, any one of the left-eye image (L) and right-eye image (R) on the 3D display 200 is displayed as the full screen white image (W); and the other is displayed as the full screen white image (W) or full screen black image (B).

The light measuring device 400 according to the first embodiment of the present invention measures and stores a white luminance ($L_{L0,WW}$) of the left-eye image (L) incident via the left lens 310 at the position corresponding to the measuring point 0 (P0). At this time, the left-eye image (L) and right-eye image (R) on the 3D display 200 are displayed as the full screen white image (W). Then, the light measuring device 400 measures and stores a white luminance ($L_{R0,WW}$) of the right-eye image (R) incident via the right lens 320 at the position corresponding to the measuring point 0 (P0). At this time, the left-eye image (L) and right-eye image (R) on the 3D display 200 are displayed as the full screen white image (W). Moreover, the light measuring device 400 calculates the luminance ($L_L$) of the left-eye image (L) with the white luminance ($L_{L0,WW}$) of the left-eye image (L) measured at the measuring point 0 (P0); and also calculates the luminance ($L_R$) of the right-eye image (R) with the white luminance ($L_{R0,WW}$) of the right-eye image (R) measured at the measuring point 0 (P0).

The light measuring device 400 according to the second embodiment of the present invention measures and stores a white luminance ($L_{L0,WB}$) of the left-eye image (L) incident via the left lens 310 at the position corresponding to the measuring point 0 (P0). At this time, the left-eye image (L) is displayed as the full screen white image (W), and the right-eye image (R) is displayed as the full screen black image (B). Then, the light measuring device 400 measures and stores a white luminance ($L_{R0,WB}$) of the right-eye image (R) incident via the right lens 320 at the position corresponding to the measuring point p (P0). At this time, the right-eye image (R) on the 3D display 200 is displayed as the full screen white image (W), and the left-eye image (L) on the 3D display 200 is displayed as the full screen black image (B). Moreover, the light measuring device 400 calculates the luminance ($L_L$) of the left-eye image (L) with the white luminance ($L_{L0,WB}$) of the left-eye image (L) measured at the measuring point 0 (P0); and also calculates the luminance ($L_R$) of the right-eye image (R) with the white luminance ($L_{R0,WB}$) of the right-eye image (R) measured at the measuring point 0 (P0).

In the measuring methods according to third to sixth exemplary embodiments of the present invention, if the average luminance, interocular luminance difference, and luminous non-uniformity are measured, any one of the left-eye image (L) and right-eye image (R) on the 3D display 200 is displayed as the full screen white image (W); and the other is displayed as the full screen white image (W) or full screen black image (B). The light measuring device 400 according to the third embodiment of the present invention measures and stores a white luminance ($L_{L0,WW}$ to $L_{L4,WW}$) for each of measuring points 0 to 4 (P0 to P4) of the left-eye image (L) incident via the left lens 310 at the respective positions corresponding to the measuring points 0 to 4 (P0 to P4). At this time, the left-eye image (L) and right-eye image (R) on the 3D display 200 are displayed as the full screen white image (W). Then, the light measuring device 400 measures and stores a white luminance ($L_{R0,WW}$ to $L_{R4,WW}$) for each of measuring points 0 to 4 (P0 to P4) of the right-eye image (R) incident via the right lens 320 at the respective positions corresponding to the measuring points 0 to 4 (P0 to P4). At this time, the left-eye image (L) and right-eye image (R) on the 3D display 200 are displayed as the full screen white image (W). Moreover, the light measuring device 400 calculates the average luminance ($L_{Lav}$) of the left-eye image (L) and the average luminance ($L_{Rav}$) of the right-eye image (R) based on the white luminance ($L_{L0,WW}$ to $L_{L4,WW}$) of the left-eye image (L) and the white luminance ($L_{R0,WW}$ to $L_{R4,WW}$) of the right-eye image (R) for each of the measuring points 0 to 4 (P0 to P4) measured at the measuring points 0 to 4 (P0 to P4).

At this time, the light measuring device 400 according to the second embodiment may calculate the average luminance ($L_{Lav}$) of the left-eye image (L) and the average luminance ($L_{Rav}$) of the right-eye image (R) by the following equation 1.

$$L_{Lav} = \frac{L_{L0} + L_{L1} + L_{L2} + L_{L3} + L_{L4}}{5} \quad \text{[Equation 1]}$$

$$L_{Rav} = \frac{L_{R0} + L_{R1} + L_{R2} + L_{R3} + L_{R4}}{5}$$

The light measuring device 400 according to the fourth embodiment measures and stores a white luminance ($L_{L0,WB}$ to $L_{L4,WB}$) for each of measuring points 0 to 4 (P0 to P4) of the left-eye image (L) incident via the left lens 310 at the respective positions corresponding to the measuring points 0 to 4 (P0 to P4). At this time, the left-eye image (L) on the 3D display 200 is displayed as the full screen white image (W), and the right-eye image (R) on the 3D display 200 is displayed as the full screen black image (B). Then, the light measuring device 400 measures and stores a white luminance ($L_{R0,WB}$ to $L_{R4,WB}$) for each of measuring points 0 to 4 (P0 to P4) of the right-eye image (R) incident via the right lens 320 at the respective positions corresponding to the measuring points 0 to 4 (P0 to P4). At this time, the right-eye image (R) on the 3D display 200 is displayed as the full screen white image (W), and the left-eye image (L) on the 3D display 200 is displayed as the full screen black image (B). Moreover, the light measuring device 400 according to the fourth embodiment calculates the average luminance ($L_{Lav}$) of the left-eye image (L) and the average luminance ($L_{Rav}$) of the right-eye image (R) based on the white luminance ($L_{L0,WB}$ to $L_{L4,WB}$) of the left-eye image (L) and the white luminance ($L_{R0,WB}$ to $L_{R4,WB}$) of the right-eye image (R) for each of the measuring points 0 to 4 (P0 to P4) measured at the measuring points 0 to 4 (P0 to P4). At this time, the light measuring device 400 according to the fourth embodiment of the present invention may calculate the average luminance ($L_{Lav}$) of the left-eye image (L) and the average luminance ($L_{Rav}$) of the right-eye image (R), as shown in the above equation 1.

The light measuring device 400 according to the fifth embodiment of the present invention measures and stores a white luminance ($L_{L0,WW}$ to $L_{L8,WW}$) for each of measuring points 0 to 8 (P0 to P8) of the left-eye image (L) incident via the left lens 310 at the respective positions corresponding to the measuring points 0 to 8 (P0 to P8). At this time, the left-eye image (L) and right-eye image (R) on the 3D display 200 are displayed as the full screen white image (W). Then, the light measuring device 400 measures and stores a white luminance ($L_{R0,WW}$ to $L_{R8,WW}$) for each of measuring points 0 to 8 (P0 to P8) of the right-eye image (R) incident via the right lens 320 at the respective positions corresponding to the measuring points 0 to 8 (P0 to P8). At this time, the left-eye image (L) and right-eye image (R) on the 3D display 200 are displayed as the full screen white image (W). Moreover, the light measuring device 400 according to the fifth embodiment calculates the average luminance ($L_{Lav}$) of the left-eye image (L) and the average luminance ($L_{Rav}$) of the right-eye image (R) based on the white luminance ($L_{L0,WW}$ to $L_{L8,WW}$) of the left-eye image (L) and the white luminance ($L_{R0,WW}$ to $L_{R8,WW}$) of the right-eye image (R) for each of the measuring points 0 to 8 (P0 to P8) measured at the measuring points 0 to 8 (P0 to P8). At this time, the light measuring device 400 according to the fifth embodiment may calculate the average luminance ($L_{Lav}$) of the left-eye image (L) and the average luminance ($L_{Rav}$) of the right-eye image (R) by the following equation 2.

$$L_{Lav} = \frac{L_{L0} + L_{L1} + L_{L2} + L_{L3} + L_{L4} + L_{L5} + L_{L6} + L_{L7} + L_{L8}}{9} \quad \text{[Equation 2]}$$

$$L_{Rav} = \frac{L_{R0} + L_{R1} + L_{R2} + L_{R3} + L_{R4} + L_{R5} + L_{R6} + L_{R7} + L_{R8}}{9}$$

Furthermore, the light measuring device 400 according to the fifth embodiment calculates the luminous non-uniformity ($\Delta L_{Li}$) of the left-eye image (L) for each measuring point based on the calculated average luminance ($L_{Lav}$) of the left-eye image (L) and the white luminance ($L_{L0,WW}$ to $L_{L8,WW}$) of the left-eye image (L) for each of the measuring points 0 to 8 (P0 to P8); and simultaneously calculates the luminous non-uniformity ($\Delta L_{Ri}$) of the right-eye image (R) for each measuring point based on the calculated average luminance ($L_{Rav}$) of the right-eye image (R) and the white luminance ($L_{R0,WW}$ to $L_{R8,WW}$) of the right-eye image (R) for each of the measuring points 0 to 8 (P0 to P8). At this time, the light measuring device 400 according to the fifth embodiment may calculate the luminous non-uniformity ($\Delta L_{Li}$) of the left-eye image (L) and the luminous non-uniformity ($\Delta L_{Ri}$) of the right-eye image (R) by the following equation 3.

$$\Delta L_{Li} = L_{Li} - L_{Lav}$$

$$\Delta L_{Ri} = L_{Ri} - L_{Rav} \quad \text{[Equation 3]}$$

In above equation 3, '$L_{Li}$' and '$L_{Ri}$' indicates the luminance at the measuring points 1 to 8. Furthermore, the light measuring device 400 according to the fifth embodiment may calculate the interocular luminance difference ($\Delta L_{av}$, L−R) by the difference between the average luminance ($L_{Lav}$) of the left-eye image (L) and the average luminance ($L_{Rav}$) of the right-eye image (R).

The light measuring device 400 according to the sixth embodiment measures and stores a white luminance ($L_{L0,WB}$ to $L_{L8,WB}$) for each of measuring points 0 to 8 (P0 to P8) of the left-eye image (L) incident via the left lens 310 at the respective positions corresponding to the measuring points 0 to 8 (P0 to P8). At this time, the left-eye image (L) on the 3D display 200 is displayed as the full screen white image (W), and the right-eye image (R) on the 3D display 200 is displayed as the full screen black image (B). The light measuring device 400 according to the sixth embodiment measures and stores a white luminance ($L_{R0,WB}$ to $L_{R8,WB}$) for each of measuring points 0 to 8 (P0 to P8) of the right-eye image (R) incident via the right lens 320 at the respective positions corresponding to the measuring points 0 to 8 (P0 to P8). At this time, the right-eye image (R) on the 3D display 200 is displayed as the full screen white image (W), and the left-eye image (L) on the 3D display 200 is displayed as the full screen black image (B). Moreover, the light measuring device 400 according to the sixth embodiment calculates the average luminance ($L_{Lav}$) of the left-eye image (L) and the average luminance ($L_{Rav}$) of the right-eye image (R) based on the white luminance ($L_{L0,WB}$ to $L_{L8,WB}$) of the left-eye image (L) and the white luminance ($L_{R0,WB}$ to $L_{R8,WB}$) of the right-eye image (R) for each of the measuring points 0 to 8 (P0 to P8) measured at the measuring points 0 to 8 (P0 to P8). At this time, the light measuring device 400 according to the sixth embodiment may calculate the average luminance ($L_{Lav}$) of the left-eye image (L) and the average luminance ($L_{Rav}$) of the right-eye image (R), as shown in the above equation 2. Furthermore, the light measuring device 400 according to the sixth embodiment calculates the luminous non-uniformity ($\Delta L_{Li}$) of the left-eye image (L) for each measuring point based on the calculated average luminance ($L_{Lav}$) of the left-eye image (L) and the white luminance ($L_{L0,WB}$ to $L_{L8,WB}$) of the left-eye image (L) for each of the measuring points 0 to 8 (P0 to P8); and simultaneously calculates the luminous non-uniformity ($\Delta L_{Ri}$) of the right-eye image (R) for each measuring point based on the calculated average luminance ($L_{Rav}$) of the right-eye image (R) and the white luminance ($L_{R0,WB}$ to $L_{R8,WB}$) of the right-eye image (R) for each of the measuring points 0 to 8 (P0 to P8). At this time, the light measuring device 400 according to the sixth embodiment may calculate the luminous non-uniformity ($\Delta L_L$) of the left-eye image (L) and the luminous non-uniformity ($\Delta L_{Ri}$) of the right-eye image (R), as shown in the above equation 3. Furthermore, the light measuring device 400 according to the sixth embodiment may calculate the interocular luminance difference ($\Delta L_{av}$, L−R) by the difference between the average luminance ($L_{Lav}$) of the left-eye image (L) and the average luminance ($L_{Rav}$) of the right-eye image (R).

In the measuring method according to the seventh embodiment of the present invention, if the dark-room contrast ratio is measured, the left-eye image (L) and right-eye image (R) on the 3D display 200 are displayed as the full screen white image (W) or full screen black image (B). The light measuring device 400 according to the seventh embodiment measures and stores a white luminance ($L_{L0,WW}$) of the left-eye image (L) incident via the left lens 310 at the position corresponding to the measuring point 0 (P0). At this time, the left-eye image (L) and right-eye image (R) on the 3D display 200 are displayed as the full screen white image (W). Then, the light measuring device 400 according to the seventh embodiment measures and stores a white luminance ($L_{R0,WW}$) of the right-eye image (R) incident via the right lens 320 at the position corresponding to the measuring point 0 (P0). At this time, the left-eye image (L) and right-eye image (R) on the 3D display 200 are displayed as the full screen white image (W). Then, the light measuring device 400 according to the seventh embodiment measures and stores a black luminance ($L_{L0,BB}$) of the left-eye image (L) incident via the left lens 310 at the position corresponding to the measuring point 0 (P0). At this time, the left-eye image (L) and right-eye image (R) on the 3D display 200 are displayed as the full screen black image (B). Then, the light measuring device 400 according to the seventh embodiment measures and stores a black luminance ($L_{R0,BB}$) of the right-eye image (R) incident via the right lens 320 at the position corresponding to the measuring point 0 (P0). At this time, the left-eye image (L) and right-eye image (R) on the 3D display 200 are displayed as the full screen black image (B). Moreover, the light measuring device 400 according to the seventh embodiment calculates the dark-room contrast ratio ($DRCR_L$) of the left-eye image (L) and the dark-room contrast ratio ($DRCR_R$) of the right-eye image (R) based on the measured white luminance ($L_{L0,WW}$) of the left-eye image (L), black luminance ($L_{L0,BB}$) of the left-eye image (L), white luminance ($L_{R0,WW}$) of the right-eye image (R), and black luminance ($L_{R0,BB}$) of the right-eye image (R). At this time, the light measuring device 400 according to the seventh embodiment may calculate the dark-room contrast ratio ($DRCR_L$) of the left-eye image (L) and the dark-room contrast ratio ($DRCR_R$) of the right-eye image (R) by the following equation 4.

$$DRCR_L = \frac{L_{L0,WW}}{L_{L0,BB}} \quad \text{[Equation 4]}$$

$$DRCR_R = \frac{L_{R0,WW}}{L_{R0,BB}}$$

Furthermore, the light measuring device 400 according to the seventh embodiment may calculate the dark-room contrast ratio (DRCR) of the 3D display 200 based on an average value of dark-room contrast ratio ($DRCR_L$) of the left-eye image (L) and the dark-room contrast ratio ($DRCR_R$) of the right-eye image (R).

In the measuring method according to the eighth embodiment, if the colour gamut of the 3D display 200 is measured, the left-eye image (L) and right-eye image (R) on the 3D display 200 are displayed as the full screen red image (Red), full screen green image (Green), or full screen blue image (Blue). The left-eye image (L) and right-eye image (R) are generated based on CIE 1976 chromaticity coordinates. The light measuring device 400 according to the eighth embodiment measures and stores a red chromaticity coordinate value ($C_L(u'_{Red}, v'_{Red})$) of the left-eye image (L) incident via the left lens 310 at the position corresponding to the measuring point 0 (P0). At this time, the left-eye image (L) and right-eye image (R) on the 3D display 200 are displayed as the full screen red image (Red). Then, the light measuring device 400 according to the eighth embodiment measures and stores a green chromaticity coordinate value ($C_L(u'_{Green}, v'_{Green})$) of the left-eye image (L) incident via the left lens 310 at the position corresponding to the measuring point 0 (P0). At this time, the left-eye image (L) and right-eye image (R) on the 3D display 200 are displayed as the full screen green image (Green). Then, the light measuring device 400 according to the eighth embodiment measures and stores a blue chromaticity coordinate value ($C_L(u'_{Blue}, v'_{Blue})$) of the left-eye image (L) incident via the left lens 310 at the position corresponding to the measuring point 0 (P0). At this time, the left-eye image (L) and right-eye image (R) on the 3D display 200 are displayed as the full screen blue image (Blue). Then, the light measuring device 400 according to the eighth embodiment measures and stores a red chromaticity coordinate value ($C_R(u'_{Red}, v'_{Red})$) of the right-eye image (R) incident via the right lens 320 at the position corresponding to the measuring point 0 (P0). At this time, the left-eye image (L) and right-eye image (R) on the 3D display 200 are displayed as the full screen red image (Red). Then, the light measuring device 400 according to the eighth embodiment measures and stores a green chromaticity coordinate value ($C_R(u'_{Green}, v'_{Green})$) of the right-eye image (R) incident via the right lens 320 at the position corresponding to the measuring point 0 (P0). At this time, the left-eye image (L) and right-eye image (R) on the 3D display 200 are displayed as the full screen green image (Green). Then, the light measuring device 400 according to the eighth embodiment measures and stores a blue chromaticity coordinate value ($C_R(u'_{Blue}, v'_{Blue})$) of the right-eye image (R) incident via the right lens 320 at the position corresponding to the measuring point 0 (P0). At this time, the left-eye image (L) and right-eye image (R) on the 3D display 200 are displayed as the full screen blue image (Blue). Moreover, the light measuring device 400 according to the eighth embodiment calculates the colour gamut of the left-eye image (L) by linearly connecting the measured red, green, and blue chromaticity coordinates ($C_L(u'_{Red}, v'_{Red})$, $C_L(u'_{Green}, v'_{Green})$, $C_L(u'_{Blue}, v'_{Blue})$) of the left-eye image (L); and also calculates the colour gamut of the right-eye image (R) by linearly connecting the measured red, green, and blue chromaticity coordinates ($C_R(u'_{Red}, v'_{Red})$, $C_R(u'_{Green}, v'_{Green})$, $C_R(u'_{Blue}, v'_{Blue})$) of the right-eye image (R). In the meantime, the light measuring device 400 according to the eighth embodiment may use the chromaticity coordinates x, y of CIE 1931 chromaticity for the measurement. For example, the chromaticity coordinate u', v' are transformed from the chromaticity coordinate x, y, as shown in the following equation 5.

$$u' = \frac{4x}{3 - 2x + 12y}$$

$$v' = \frac{9y}{3 - 2x + 12y}$$

[Equation 5]

In the measuring method according to the ninth embodiment of the present invention, if the white chromaticity and interocular luminance difference are measured, the left-eye image (L) and right-eye image (R) on the 3D display 200 are displayed as the full screen white image (W). The light measuring device 400 according to the ninth embodiment measures and stores chromaticity coordinates ($C_L(u'_0, v'_0)$) of the left-eye image (L) incident via the left lens 310 at the position corresponding to the measuring point 0 (P0). At this time, the left-eye image (L) and right-eye image (R) on the 3D display 200 are displayed as the full screen white image (W). Also, the measured chromaticity coordinates ($C_L(u'_0, v'_0)$) of the left-eye image (L) may be formed by CIE 1976 UCS chromaticity coordinates. Then, the light measuring device 400 according to the ninth embodiment measures and stores chromaticity coordinates ($C_R(u'_0, v'_0)$) of the right-eye image (R) incident via the right lens 320 at the position corresponding to the measuring point 0 (P0). At this time, the left-eye image (L) and right-eye image (R) on the 3D display 200 are displayed as the full screen white image (W). Also, the measured chromaticity coordinates ($C_R(u'_0, v'_0)$) of the right-eye image (R) may be formed by CIE 1976 UCS chromaticity coordinates. In the meantime, the light measuring device 400 according to the ninth embodiment calculates the white chromaticity ($C_L(u', v')$) of the left-eye image (L) by the measured chromaticity coordinates ($C_L(u'_0, v'_0)$) of the left-eye image (L); and also calculates the white chromaticity ($C_R(u', v')$) of the right-eye image (R) by the measured chromaticity coordinates ($C_R(u'_0, v'_0)$) of the right-eye image (R). At this time, the light measuring device 400 according to the ninth embodiment may use the chromaticity coordinates x, y of CIE 1931 chromaticity for the measurement. For example, the chromaticity coordinate u', v' are transformed from the chromaticity coordinate x, y, as shown in the above equation 5. Furthermore, the light measuring device 400 according to the ninth embodiment may calculate the interocular chromatic difference ($\Delta_{LR}u'$, $\Delta_{LR}v'$) of the 3D display 200 based on the white chromaticity ($C_L(u', v')$) of the left-eye image (L) and the white chromaticity ($C_R(u', v')$) of the right-eye image (R). At this time, the light measuring device 400 according to the ninth embodiment may calculate the interocular chromatic difference ($\Delta_{LR}u'$, $\Delta_{LR}v'$) by the following equation 6.

$$\Delta_{LR}u' = u'_{L0} - u'_{R0}$$

$$\Delta_{LR}v' = v'_{L0} - v'_{R0}$$

[Equation 6]

In the measuring method according to the tenth and eleventh embodiments of the present invention, if the luminous non-uniformity of the 3D display 200 is measured, the left-eye image (L) and right-eye image (R) on the 3D display 200 are displayed as the full screen white image (W).

The light measuring device 400 according to the tenth embodiment measures and stores chromaticity coordinates ($C_L(u'_i, v'_i)$), herein, 'i' is the measuring point from 0 to 4 for each of measuring points 0 to 4 (P0 to P4) of the left-eye image (L) incident via the left lens 310 at the respective positions corresponding to the measuring points 0 to 4 (P0 to P4). At this time, the left-eye image (L) and right-eye image (R) on the 3D display 200 are displayed as the full screen white image (W). Then, the light measuring device 400 according to the tenth embodiment measures and stores chromaticity coordinates ($C_R(u'_i, v'_i)$), herein, 'i' is the measuring point from 0 to 4 for each of measuring points 0 to 4 (P0 to P4) of the right-eye image (R) incident via the right lens 320 at the respective positions corresponding to the measuring points 0 to 4 (P0 to P4). At this time, the left-eye image (L) and right-eye image (R) on the 3D display 200 are displayed as the full screen white image (W). In the meantime, the light measuring device 400 according to the tenth embodiment calculates the chromatic non-uniformity ($\Delta u'_{Li}$, $\Delta v'_{Li}$) of the left-eye image (L) based on the measured chromaticity coordinates ($C_L(u'_i, v'_i)$) of the left-eye image (L) for each of the measuring points 0 to 4 (P0 to P4); and also calculates the chromatic non-uniformity ($\Delta u'_{Ri}$, $\Delta v'_{Ri}$) of the right-eye image (R) based on the measured chromaticity coordinates ($C_R(u'_i, v'_i)$) of the right-eye image (R) for each of the measuring points 0 to 4 (P0 to P4). At this time, the light measuring device 400 according to the tenth embodiment may calculate the chromatic non-uniformity ($\Delta u'_{Li}$, $\Delta v'_{Li}$) of the left-eye image (L) and the chromatic non-uniformity ($\Delta u'_{Ri}$, $\Delta v'_{Ri}$) of the right-eye image (R) by the following equation 7. Meanwhile, the light measuring device 400 according to the tenth embodiment may use the chromaticity coordinates x, y of CIE 1931 chromaticity for the measurement. For example, the chromaticity coordinate u', v' are transformed from the chromaticity coordinate x, y, as shown in the above equation 5.

$$\Delta u'_{Li}=u'_{Li}-u'_{L0}, \Delta v'_{Li}=v'_{Li}-v'_{L0}$$

$$\Delta u'_{Ri}=u'_{Ri}-u'_{R0}, \Delta v'_{Ri}=v'_{Ri}-v'_{R0} \quad \text{[Equation 7]}$$

In above equation 7, '$_{Li}$' indicates the integer from 1 to 4; '$u'_{Li}$' and '$u'_{Ri}$' indicate the u' value of the chromaticity coordinates ($C_L(u'_i, v'_i)$) measured at the measuring point 'i'; and the '$v'_{Li}$' and '$v'_{Ri}$' indicate the v' value of the chromaticity coordinates ($C_L(u'_i, v'_i)$) measured at the measuring point 'i'.

The light measuring device 400 according to the eleventh embodiment of the present invention measures and stores chromaticity coordinates ($C_L(u'_i, v'_i)$), herein, 'i' is the measuring point from 0 to 8 for each of measuring points 0 to 8 (P0 to P8) of the left-eye image (L) incident via the left lens 310 at the respective positions corresponding to the measuring points 0 to 8 (P0 to P8). At this time, the left-eye image (L) and right-eye image (R) on the 3D display 200 are displayed as the full screen white image (W). Then, the light measuring device 400 according to the eleventh embodiment measures and stores chromaticity coordinates ($C_R(u'_i, v'_i)$), herein, 'i' is the measuring point from 0 to 8 for each of measuring points 0 to 8 (P0 to P8) of the right-eye image (R) incident via the right lens 320 at the respective positions corresponding to the measuring points 0 to 8 (P0 to P8). At this time, the left-eye image (L) and right-eye image (R) on the 3D display 200 are displayed as the full screen white image (W). In the meantime, the light measuring device 400 according to the eleventh embodiment calculates the chromatic non-uniformity ($\Delta u'_{Li}$, $\Delta v'_{Li}$) of the left-eye image (L) based on the measured chromaticity coordinates ($C_L(u'_i, v'_i)$) of the left-eye image (L) for each of the measuring points 0 to 8 (P0 to P8); and also calculates the chromatic non-uniformity ($\Delta u'_{Ri}$, $\Delta v'_{Ri}$) of the right-eye image (R) based on the measured chromaticity coordinates ($C_R(u'_i, v'_i)$) of the right-eye image (R) for each of the measuring points 0 to 8 (P0 to P8). At this time, the light measuring device 400 according to the eleventh embodiment may calculate the chromatic non-uniformity ($\Delta u'_{Li}$, $\Delta v'_{Li}$) of the left-eye image (L) and the chromatic non-uniformity ($\Delta u'_{Ri}$, $\Delta v'_{Ri}$) of the right-eye image (R) by the following equation 8.

$$\Delta u'_{Li}=u'_{Li}-u'_{L0}, \Delta v'_{Li}=v'_{Li}-v'_{L0}$$

$$\Delta u'_{Ri}=u'_{Ri}-u'_{R0}, \Delta v'_{Ri}=v'_{Ri}-v'_{R0} \quad \text{[Equation 8]}$$

In above equation 8, '$_{Li}$' indicates the integer from 1 to 8; '$u'_{Li}$' and '$u'_{Ri}$' indicate the u' value of the chromaticity coordinates ($C_L(u'_i, v'_i)$) measured at the measuring point 'i'; and the '$v'_{Li}$' and '$v'_{Ri}$' indicate the v' value of the chromaticity coordinates ($C_L(u'_i, v'_i)$) measured at the measuring point 'i'.

The light measuring device 400 according to the eleventh embodiment may use the chromaticity coordinates x, y of CIE 1931 chromaticity for the measurement. For example, the chromaticity coordinate u', v' are transformed from the chromaticity coordinate x, y, as shown in the above equation 5.

In the measuring method according to the twelfth embodiment of the present invention, if measuring the gamma value of the 3D display 200, any one of the left-eye image (L) and right-eye image (R) on the 3D display 200 is displayed as the full screen gray image (G) whose gray level is changed from a full screen black gray to a full screen white gray every predetermined number of frames, and the other is displayed as the full screen white image (W) or full screen black image (B).

The light measuring device 400 according to the twelfth embodiment measures and stores a luminance ($GL_{L0,GW}$) for each predetermined gray of the left-eye image (L) incident via the left lens 310 at the position corresponding to the measuring point 0 (P0). At this time, the left-eye image (L) on the 3D display 200 is displayed as the full screen gray image (G), and the right-eye image (R) on the 3D display 200 is displayed as the full screen white image (W). Then, the light measuring device 400 according to the twelfth embodiment measures and stores a luminance ($GL_{R0,GW}$) for each predetermined gray of the right-eye image (R) incident via the right lens 320 at the position corresponding to the measuring point 0 (P0). At this time, the right-eye image (R) on the 3D display 200 is displayed as the full screen gray image (G), and the left-eye image (L) on the 3D display 200 is displayed as the full screen white image (W). Moreover, the light measuring device 400 according to the twelfth embodiment calculates the gamma value ($GV_L$) of the left-eye image (L) based on the measured luminance for each of the specified gray levels ($GL_{L0,GW}$) in the left-eye image (L); and also calculates the gamma value ($GV_R$) of the right-eye image (R) based on the measured luminance for each of the specified gray levels ($GL_{R0,GW}$) in the right-eye image (R).

The light measuring device 400 according to the thirteenth embodiment of the present invention measures and stores a luminance ($GL_{L0,GB}$) for each predetermined gray of the left-eye image (L) incident via the left lens 310 at the position corresponding to the measuring point 0 (P0). At this time, the left-eye image (L) on the 3D display 200 is displayed as the full screen gray image (G), and the right-eye image (R) on the 3D display 200 is displayed as the full screen black image (B).

Then, the light measuring device 400 according to the thirteenth embodiment measures and stores a luminance ($GL_{R0,GB}$) for each predetermined gray of the right-eye image (R) incident via the right lens 320 at the position corresponding to the measuring point 0 (P0). At this time, the right-eye image (R) on the 3D display 200 is displayed as the full screen gray image (G), and the left-eye image (L) on the 3D display 200 is displayed as the full screen black image (B). In the meantime, the light measuring device 400 according to the thirteenth embodiment calculates the gamma value ($GV_L$) of the left-eye image (L) based on the measured luminance for each of the specified gray levels ($GL_{L0,GB}$) in the left-eye image (L); and also calculates the gamma value ($GV_R$) of the right-eye image (R) based on the measured luminance for each of the specified gray levels ($GL_{R0,GB}$) in the right-eye image (R).

The light measuring device 400 according to the fourteenth embodiment of the present invention measures and stores a luminance ($GL_{L0,GG}$) for each predetermined gray of the left-eye image (L) incident via the left lens 310 at the position corresponding to the measuring point 0 (P0). At this time, the left-eye image (L) and right-eye image (R) on the 3D display 200 are displayed as the same full screen gray image (G). Then, the light measuring device 400 according to the fourteenth embodiment measures and stores a luminance ($GL_{R0,GG}$) for each predetermined gray of the right-eye image (R) incident via the right lens 320 at the position corresponding to the measuring point 0 (P0). At this time, the left-eye image (L) and right-eye image (R) on the 3D display 200 are displayed as the same full screen gray image (G). In the meantime, the light measuring device 400 according to the fourteenth embodiment calculates the gamma value ($GV_L$) of the left-eye image (L) based on the measured luminance for each of the specified gray levels ($GL_{L0,GG}$) in the left-eye image (L); and also calculates the gamma value ($GV_R$) of the right-eye image (R) based on the measured luminance for each of the specified gray levels ($GL_{R0,GG}$) in the right-eye image (R).

A detailed method for calculating the gamma value by any one of the light measuring devices 400 according to the twelfth to fourteenth embodiments of the present invention will be described as follows.

Figure 8A:
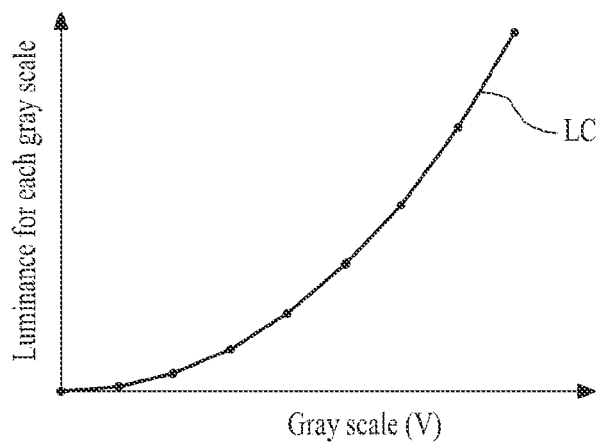
FIGS. 8A and 8B schematically illustrate a method of measuring gamma values of left-eye image and right-eye image by a light measuring device according to an exemplary embodiment of the present invention.

First, the luminance curve (LC) based on the gray scale (V) is obtained by connecting the luminance for each of the specified gray scales (GL) in the left-eye image (L), as shown in FIG. 8A. Then, a log gray scale value (Log(V)) is calculated by logging each gray scale value. Then, the black luminance ($GL_0$) is subtracted from the calculated luminance for each of the specified gray scales ($GL_0$), to thereby calculate the luminance difference for each gray scale ($GL-GL_0$). Also, the log luminance value ($Log(GL-GL_0)$) is calculated by logging the luminance difference for each gray scales ($GL-GL_0$).

Figure 8B:
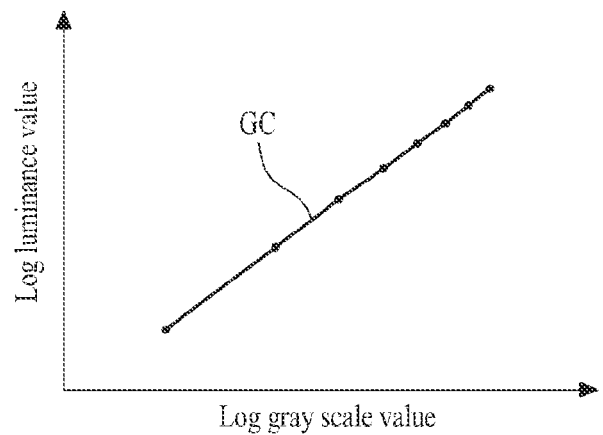

As shown in FIG. 8B, the gamma curve (GC) is obtained by the calculated log gray scale value (Log(V)) and log luminance value ($Log(GL-GL_0)$). The gamma value of the gamma curve (GC) is calculated with an inclination of regression equation based on a regression analysis for the obtained gamma curve (GC). Eventually, any one of the light measuring devices 400 according to the twelfth to fourteenth embodiment of the present invention calculates the gamma value ($GV_L$) of the left-eye image (L) and the gamma value ($GV_R$) of the right-eye image (R) by the aforementioned method of measuring the gamma value.

The optical measuring apparatus and method for the stereoscopic display device according to the above-described exemplary embodiments of the present invention displays the left-eye image (L) and/or right-eye image (R) on the 3D display 200; and measures the intensity or color information of the left-eye image (L) or right-eye image (R) via the image selection member (or polarizer glasses) 300 by selectively transmitting the left-eye image (L) or right-eye image (R) through the 3D display 200, which enables the objective measurement for the optical characteristics of the 3D display 200.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An optical measuring apparatus for a stereoscopic display device comprising:
   a test image supplier for generating a 3D test signal;
   a 3D display for displaying a left-eye image and/or a right-eye image based on the 3D test signal supplied from the test image supplier;
   an image selection member selectively transmitting the left-eye image or the right-eye image displayed on the 3D display; and
   a light measuring device providing movable in two dimensions parallel to a plane containing plural measuring points on a screen of the 3D display,
   wherein the plural measuring points consisting of:
   a center measuring point that is set to be positioned in a center of the screen of the 3D display;
   first to fourth measuring points that are set to be positioned at the respective corners of the screen of the 3D display; and
   fifth to eighth measuring points that are set to be positioned between two neighboring measuring points of first to fourth measuring points,
   wherein the light measuring device measures intensity of the left-eye image and the right-eye image transmitted via the image selection member at the position corresponding to each of the plural measuring points on a screen of the 3D display,
   wherein the light measuring device calculates:
   an average luminance of the left-eye image by averaging a white luminance for each of the specific measuring points of the left-eye image;
   an average luminance of the right-eye image by averaging an white luminance for each of the specific measuring points of the right-eye image;
   a luminous non-uniformity for each of the specified measuring points of the left-eye image by subtracting the average luminance of the left-eye image from the white luminance for each of the specified measuring points of the left-eye image; and
   a luminous non-uniformity for each of the specified measuring points of the right-eye image by subtracting the average luminance of the right-eye image from the white luminance for each of the specified measuring points of the right-eye image.

2. The apparatus according to claim 1, wherein the light measuring device measures:
   the white luminance for each of the specified measuring points of the left-eye image corresponding to a full screen white image incident via the image selection member at the respective positions corresponding to the center measuring point and first to fourth measuring points or the center measuring point and first to eighth measuring points; and
   the white luminance for each of the specified measuring points of the right-eye image corresponding to the full screen white image incident via the image selection member at the respective positions corresponding to the center measuring point and first to fourth measuring points or the center measuring point and first to eighth measuring points.

3. The apparatus according to claim 1, wherein the image selection member is provided at an interval of at least 10 mm from the light measuring device, the optical measuring apparatus is installed inside a dark room maintained at 1 Lux or less, and a measuring distance between the light measuring device and the 3D display is above 2 meters, or 3L, wherein, , 'L' is a height, width, or diagonal length of screen of the 3D display.

4. The apparatus according to claim 1, wherein the 3D display displays the left-eye image and/or right-eye image that are temporally or spatially divided.

5. The apparatus according to claim 1, wherein the 3D display comprises:
a display panel displaying the left-eye image and/or the right-eye image; and
a panel driver converting the 3D test signal to the left-eye image and/or the right-eye image.

6. The apparatus according to claim 5, wherein the panel driver includes:
an image converter converting the 3D test signal to the left-eye image or the right-eye image every one frame; and
a shutter control signal generator generating and transmitting a shutter control signal corresponding to the left-eye image or the right-eye image displayed on the display panel every one frame.

7. The apparatus according to claim 6, wherein the image selection member includes:
a left-eye lens of the glasses transmitting only the left-eye image displayed on the 3D display panel according to the shutter control signal; and
a right-eye lens of the glasses transmitting only the right-eye image displayed on the 3D display panel according to the shutter control signal.

8. The apparatus according to claim 5, wherein the display panel includes:
a plural left-eye image displaying lines and a plural right-eye image displaying lines for displaying alternately the left-eye image and the right-eye image;
a plural left-eye retarder patterns polarizing the left-eye images displayed in the left-eye image displaying lines; and
a plural right-eye retarder patterns polarizing the right-eye images displayed in the right-eye image displaying lines.

9. The apparatus according to claim 8, wherein the image selection member includes:
a left-eye lens of the glasses transmitting only the left-eye image displayed on the 3D display panel; and
a right-eye lens of the glasses transmitting only the right-eye image displayed on the 3D display panel.

10. An optical measuring method for a stereoscopic display device comprising:
generating a 3D test signal;
displaying a left-eye image and/or a right-eye image based on the 3D test signal on a 3D display;
transmitting the left-eye image or that right-eye image that are displayed on the 3D display through an image selection member; and
measuring intensity of the left-eye image or the right-eye image transmitted via the image selection member through the use of a light measuring device providing movable in two dimensions parallel to a plane containing at the position corresponding to each of plural measuring points on a screen of the 3D display,
wherein the plural measuring points consisting of:
a center measuring point that is set to be positioned in a center of the screen of the 3D display;
first to fourth measuring points that are set to be positioned at the respective corners of the screen of the 3D display; and
fifth to eighth measuring points that are set to be positioned between two neighboring measuring points of first to fourth measuring points,
wherein the light measuring device calculates:
an average luminance of the left-eye image by averaging a white luminance for each of the specific measuring points of the left-eye image;
an average luminance of the right-eye image by averaging an white luminance for each of the specific measuring points of the right-eye image;
a luminous non-uniformity for each of the specified measuring points of the left-eye image by subtracting the average luminance of the left-eye image from the white luminance for each of the specified measuring points of the left-eye image; and
a luminous non-uniformity for each of the specified measuring points of the right-eye image by subtracting the average luminance of the right-eye image from the white luminance for each of the specified measuring points of the right-eye image.

11. The method according to claim 10, wherein the light measuring device measures:
the white luminance for each of the specified measuring points of the left-eye image corresponding to a full screen white image incident via the image selection member at the respective positions corresponding to the center measuring point and first to fourth measuring points or the center measuring point and first to eighth measuring points; and
the white luminance for each of the specified measuring points of the right-eye image corresponding to the full screen white image incident via the image selection member at the respective positions corresponding to the center measuring point and first to fourth measuring points or the center measuring point and first to eighth measuring points.

12. The method according to claim 10, wherein the image selection member is provided at an interval of at least 10 mm from the light measuring device, the optical measuring apparatus is installed inside a dark room maintained at 1 Luxor less, and a measuring distance between the light measuring device and the 3D display is above 2 meters, or 3L, wherein, 'L' is a height, width, or diagonal length of screen of the 3D display.

13. The method according to claim 10, wherein the 3D display displays the left-eye image and/or right-eye image that are temporally or spatially divided.

14. The method according to claim 10, wherein the image selection member includes a left-eye lens of the glasses and a right-eye lens of the glasses, and
wherein the process of transmitting the left-eye image or that right-eye image that are displayed on the 3D display through an image selection member comprises:
generating and transmitting a shutter control signal corresponding to the left-eye image or the right-eye image displayed on the 3D display every one frame,
transmitting only the left-eye image displayed on the 3D display panel through the left-eye lens of the glasses according to the shutter control signal; and
transmitting only the right-eye image displayed on the 3D display panel through the right-eye lens of the glasses according to the shutter control signal.

15. The method according to claim 14, wherein the light measuring device measures:
the white luminance for each of the specified measuring points of the left-eye image corresponding to a full screen white image incident via the left-eye lens of the glasses at the respective positions corresponding to the center measuring point and first to fourth measuring points or the center measuring point and first to eighth measuring points; and the white luminance for each of the specified measuring points of the right-eye image corresponding to the full screen white image incident via the right-eye lens of the glasses at the respective positions corresponding to the center measuring point and first to fourth measuring points or the center measuring point and first to eighth measuring points.

* * * * *